US005152145A

United States Patent [19]

Miotke et al.

[11] Patent Number: 5,152,145

[45] Date of Patent: Oct. 6, 1992

[54] TURBOCHARGER WASTE GATE BRAKE AND SYSTEM THEREFOR

[75] Inventors: Ronald Miotke, Southfield; David F. Scherer, Ortonville, both of Mich.

[73] Assignee: Allied-signal Inc., Morristown, N.J.

[21] Appl. No.: 444,072

[22] Filed: Nov. 30, 1989

[51] Int. Cl.[5] ...................... F02D 23/00; F16K 31/02; F02B 37/12

[52] U.S. Cl. ........................................ 60/602; 251/68; 251/89; 251/129.04; 251/129.16

[58] Field of Search ................ 251/68, 69, 89, 129.04, 251/129.15, 129.16; 60/602; 335/168, 170, 172, 174; 318/366, 367, 368, 369, 372

[56] References Cited

U.S. PATENT DOCUMENTS

| | | | |
|---|---|---|---|
| 1,559,018 | 10/1925 | Taylor | 251/69 |
| 1,630,263 | 5/1927 | Gravel | 251/129.16 |
| 1,902,027 | 3/1933 | Henkel | 251/129.16 |
| 2,288,912 | 7/1942 | Mears | 251/129.16 |
| 2,289,456 | 7/1942 | Ray | 251/129.16 |
| 2,391,669 | 12/1945 | Baker | 251/69 |
| 2,588,137 | 3/1952 | Marvin | 251/129.16 |
| 2,630,832 | 3/1953 | Lutherer | 251/69 |
| 2,712,429 | 7/1955 | Ray | 251/68 |
| 3,358,207 | 12/1967 | Natho | 251/69 |
| 3,788,596 | 1/1974 | Maeda | 251/69 |
| 4,679,398 | 7/1987 | Nishiguchi et al. | 60/602 |
| 4,691,521 | 9/1987 | Hirabayashi et al. | 60/602 |
| 4,697,421 | 10/1987 | Otobe et al. | 60/602 |
| 4,741,163 | 5/1988 | Hidaka et al. | 60/602 |
| 4,745,752 | 5/1988 | Suzuki | 60/602 |
| 4,745,753 | 5/1988 | Tadokora et al. | 60/602 |
| 4,909,035 | 3/1990 | Tadokoro et al. | 60/602 |

*Primary Examiner*—George L. Walton
*Attorney, Agent, or Firm*—Markell Seitzman

[57] ABSTRACT

A waste gate brake device (50,110,200) for controlling a waste gate (34) of a turbocharger (20) comprising: a housing (52, 112) defining a chamber (54;116) and first opening (58*a,b*;122) into the chamber; a shaft (60) adapted to be connected to and movable with the motion of a waste gate (34); a magnetically responsive plate or clamp (72; 140) interacts with an electromagnetic assembly (92; 130) within a common magnetic path in response to an electromagnetic force in such path and for preventing the shaft (60) from moving, thereby preventing the waste gate from moving.

36 Claims, 2 Drawing Sheets

TURBOCHARGER WASTE GATE BRAKE AND SYSTEM THEREFOR

BACKGROUND AND SUMMARY OF THE INVENTION

The present invention relates to an electromagnetic device for halting the motion of a turbocharger waste gate.

To control the speed of the turbocharger and hence the amount of turbo boost imparted to the engine, turbochargers employ a waste gate rotatably positioned within a bypass passage. As engine speed increases so does the velocity of the exhaust stream which will tend to move the waste gate from a closed position toward an open position. Turbocharger boost is controlled by halting further the motion of the waste gate. Prior waste gate control devices have utilized pneumatic controls based upon intake manifold pressure. These pneumatic control devices are typically activated by positive pressure. In smaller engines an additional pump may also be required. These devices have proven ineffective and unreliable due to the vagaries in available pressure.

It is an object of the present invention to provide an electromagnetic waste gate brake. A further object of the present invention is to provide a device that does not display the deficiencies of the prior art.

Accordingly, the invention comprises: a waste gate brake for controlling a waste gate of a turbocharger comprising: a housing defining a chamber and first opening into the chamber; a shaft adapted to be connected to and movable with the motion of a waste gate; first means for defining a magnetic path, for generating an electromagnetic force in such path and for preventing the shaft from moving, thereby preventing the waste gate from moving. In one embodiment the waste gate brake includes a flat plate connected to a hollow shaft and an electromagnet situated below the plate. Upon energizing of the electromagnet it moves toward the plate by the magnetic forces generated. In this condition the axial motion of the shaft and hence the waste gate is restricted since the electromagnet has extrememly limited motion in a direction parallel to the shaft axis. In another embodiment a circular electromagnet is used which interacts with cylindrical split rings to prohibit shaft motion. Additionally the invention is applied to a system for controlling an engine turbocharger.

Many other objects and purposes of the invention will be clear from the following detailed description of the drawings.

DETAILED DESCRIPTION OF THE DRAWINGS

Figure 1:
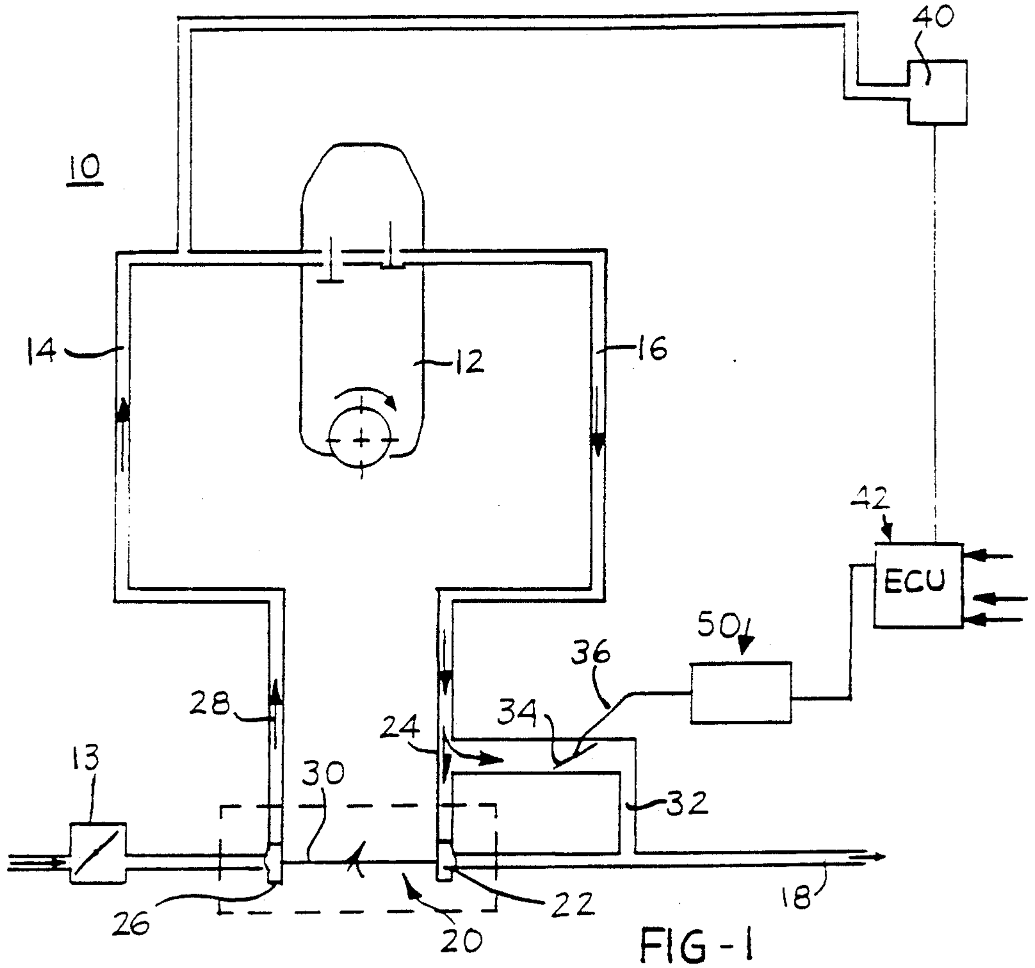
FIG. 1 is a schematic drawing of an engine equipped with a turbocharger.

FIG. 1 illustrates a turbocharger related system 10 for controlling the operation of an engine 12. An intake manifold 14 and exhaust manifold 16 are schematically shown communicating with the engine 12. Upstream of the intake manifold is a throttle 13 controlled by the vehicle operator or electromagnetically as known in the art. The exhaust manifold is communicated to the remainder of the exhaust system generally shown as 18. Positioned in communication with the intake and exhaust manifolds 14 and 16 respectively, is a turbocharger generally shown as 20. The turbocharger includes an exhaust blade 22 in communication with the exhaust gases generally shown as 24 and a boost blade 26 for supplying boost air generally shown as 28 to the intake manifold. The exhaust and boost blades 22 and 26 respectively are linked by a common shaft 30. Upstream of the exhaust blade is a bypass passage 32 communicating the exhaust manifold to the remainder of the exhaust system 18. Positioned within the bypass passage 32 is a turbocharger waste gate 34 having a linkage member 36 extending from the bypass passage 32. A waste gate brake 50 of the type described below is attached to and movable with the linkage 36.

In operation as engine speed N increases, the exhaust gases will rotate the exhaust blade 22 thereby increasing turbocharger boost to the engine. A portion of the exhaust stream is also diverted into the bypass passage 32 moving the waste gate from a position closing the bypass passage toward a fully open position. At any particular instant in time an equilibrium condition may exist, that is, for a given amount of exhaust gases the waste gate 34 will be moved to a determinable position and the turbocharger will generate a determinable level of boost. By monitoring the degree of turbocharger boost such as by a manifold absolute pressure (MAP) sensor 40, an associated electronic control unit (ECU) 42 can compare the degree of boost with a desired value based upon air flow, engine speed or other operating parameters, and thereby halt, fix or brake further motion of the waste gate by generating appropriate control signals to the waste gate brake 50, thereby controlling the amount of exhaust gases diverted into the bypass passage 32 which in turn will maintain turbocharger boost at the desired value.

Figure 2:
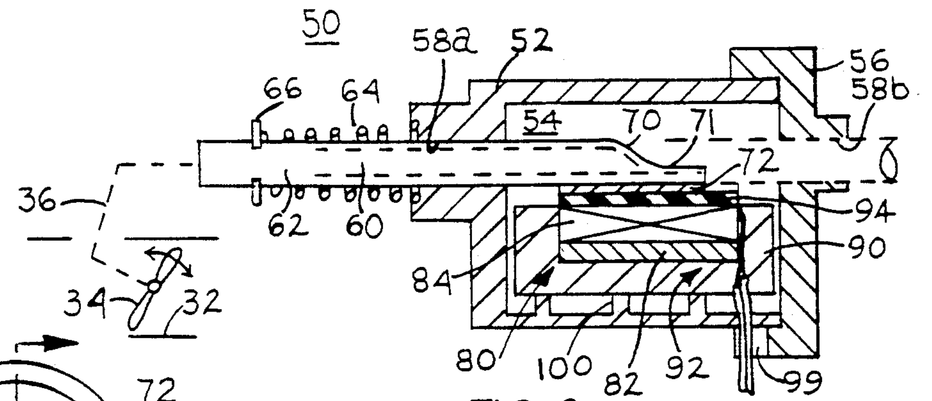
FIG. 2 illustrates a cross-sectional side view of a waste gate brake.

FIG. 2 illustrates a cross-sectional side view of one embodiment of the invention showing a waste gate brake 50 having preferably a non-magnetic housing 52 defining a cavity 54 enclosed by an end cap 56. The housing 52 includes at least one flanged opening **58*a* into which is received a shaft 60. One end 62 of the shaft is connected to and moved by the waste gate linkage 36. The shaft 60 is preferably hollow to reduce its mass. The shaft 60 is biased outwardly by a preload spring 64 one end of which is secured by a spring retainer 66. In one embodiment of the invention the other end 70 of the shaft is narrowed and attached, such as by welding, to a ferromagnetic (steel) plate 72. In another embodiment the shaft (shown by dotted lines) extends through a second flanged opening 58*b* of the end cap 56. The housing 52 is preferably non-magnetic (plastic, aluminum, etc.). The flanged openings 58*a,b* provide a bearing-like support for the shaft 60. To enhance the ease of sliding motion of the shaft 60**, the walls of the opening(s) 58 may be coated with a low friction coating such as Teflon or the like. Alternately separate bushings (not shown) can be inserted in the openings 58 to support the shaft. Movably positioned within the lower portion of the cavity 54 is an electromagnet 80 comprising a stator 82 preferably of a C-shape or E-shape and a coil 84 for generating a magnetic force substantially perpendicular to the axis of the shaft 60. The electromagnet 80 may be embedded in a potting compound 90. Wires of the magnet 80 extend through an opening 99 in the housing 52. A layer of optional friction material 94 covers the coil 84 and ends of the electromagnet 80. This friction material can be fabricated of elastomeric friction material. The electromagnet 80 and potting compound 90 (and friction material if attached) form an electromagnetic assembly 92 which is vertically movable (slidable) within the housing 52 toward the plate 72.

Figure 3:
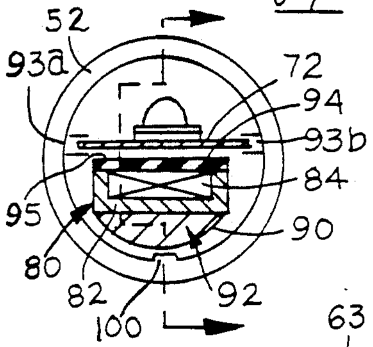
FIG. 3 illustrates a cross-sectional end view of the waste gate brake of FIG. 2.

Reference is made to the cross-sectional view of FIG. 3. Longitudinally extending about the sides of the housing 52 are a plurality of plate guides 93*a* and *b* into which the plate 72 is slidably received. These guides prohibit rotation of the plate 72 and shaft 60 relative to the working face 95 of the electromagnet 80. Other means for preventing the rotation of the shaft 60 and plate 72 are within the scope of the invention. As an example, the shaft and/or openings 56 may be fitted with a keyway or splines.

The housing 52 further includes a plurality of standoffs 100 situated at the bottom of the chamber 54 to maintain the bottom of the electromagnetic assembly 92 (potting compound 90) spaced from the lower surfaces of the housing.

The operation of the waste gate brake 50 is as follows. The waste gate 34 is moved in response to the magnitude of exhaust gases flowing within the system. The shaft 60 connected to the waste gate 34 by the linkage 36 is moved into the housing 52 against the force of the spring 64 as the waste gate opens. The spring 64 is sized to maintain the waste gate 34 closed below a certain level of exhaust gas flow. This level will vary with each installation. In response to a control signal generated by the ECU 42 indicative of a desired level of turbocharge boost, the electromagnet 80 is energized. The electromagnet develops a magnetic force of attraction with the steel plate 72 thereby causing the electromagnet to move upwardly in the housing placing the friction material 94 into contact with the plate 72. Since the electromagnetic assembly 92 is closely spaced relative to the housing in an axial direction, the axial motion of the electromagnetic assembly is restricted. Upon contact of the electromagnet 80 (friction material) with the plate 72, the shaft 60 and hence the waste gate 34 is locked in place until the control signals are removed, thereupon the waste gate will move in response to magnitude the then current exhaust gas stream. The layer of friction material 94 can be attached to plate 72, however, this would increase the mass of the moving parts of the brake 50. It should be appreciated that the friction material is optional, however, if not used the coil 84 will have to generate a higher level of magnetic force. In addition, the clearances will degrade due to metal-to-metal contact.

Figure 4:
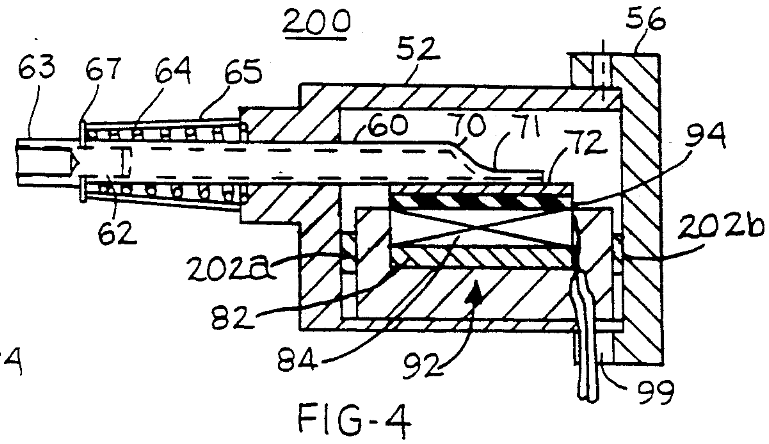
FIG. 4 illustrates a cross-sectional view of an alternate embodiment of the invention.
Figure 5:
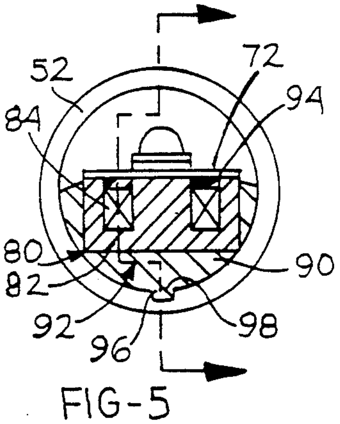
FIG. 5 illustrates a cross-sectional end view of the device shown in FIG. 4.

FIGS. 4 and 5 illustrate an alternate embodiment of the present invention. More specifically these Figures illustrate a turbocharger brake 200 having a shaft 60, housing 52, and end cap 56. The shaft 60 is outwardly biased by the spring 64 and retained relative to the shaft by a washer or retainer 67. The spring 64 may be covered with a resilient (rubber) skin 65 which acts as an environmental cover. The end 62 of the shaft is adapted to receive a coupling 63 connected to the linkage 36 of the waste gate 34. The inner end 70 of the shaft is flattened at 71 upon which is received a flat plate 72 in the manner described above. The electromagnet and more specifically the stator 82 is shown as an E-shape magnet, however, as mentioned above other magnet shapes are usable within the present invention. Situated between the center leg of the stator 82 is the coil 84. Bonded or otherwise secured above the coil 84 are a plurality of strips of friction material 94 which extend above the end plane of the legs of the stator 82. (If a C-shape magnet were used then only one piece of friction material 94 would be employed.) The stator 82 is bonded to a potting compound 90 having an arcuate shape similar to the circular cross section of the housing 52. In an alternate embodiment of the invention, the separate strip(s) of friction material is not used. In this embodiment the potting compound 90 covers the entire stator 82 and coil 84. The potting compound residing at the top surface of the stator 82 serves as the friction generating surface. Of course the potting compound or at least its top surface need to be formulated to have the desired friction coefficient. The central bottom portion of the housing includes an axially extending groove 96 into which is received an axially extending projection 98 formed as part of the potting compound 90. The cooperation of the groove 96 and projection 98 provide rotational stability for the electromagnetic assembly 80. The size of the groove (shown exaggerated) is approximately 0.5 millimeters which is less than then vertical motion of the electromagnetic coil upon actuation. The operation of this embodiment of the invention shown in FIGS. 4 and 5 is identical to that described relative to FIGS. 2 and 3. Further, to enhance the vertical motion of the electromagnetic assembly 80, the potting compound 90 or alternatively the walls of the housing 52 may include standoffs 202*a,b*. As can be appreciated the narrow standoffs reduce the sliding friction acting on the electromagnetic assembly 92.

During continued operation of the waste gate 200, it can be expected that its various materials will wear. An additional advantage of the standoffs 202*a* and *b* is that they space the potting material 90 from the housing, defining capture areas (cavities, etc.) into which metal filings, particles of friction material, and potting compound can accumulate in a manner so as not to affect the operation of the waste gate brake.

Figure 6:
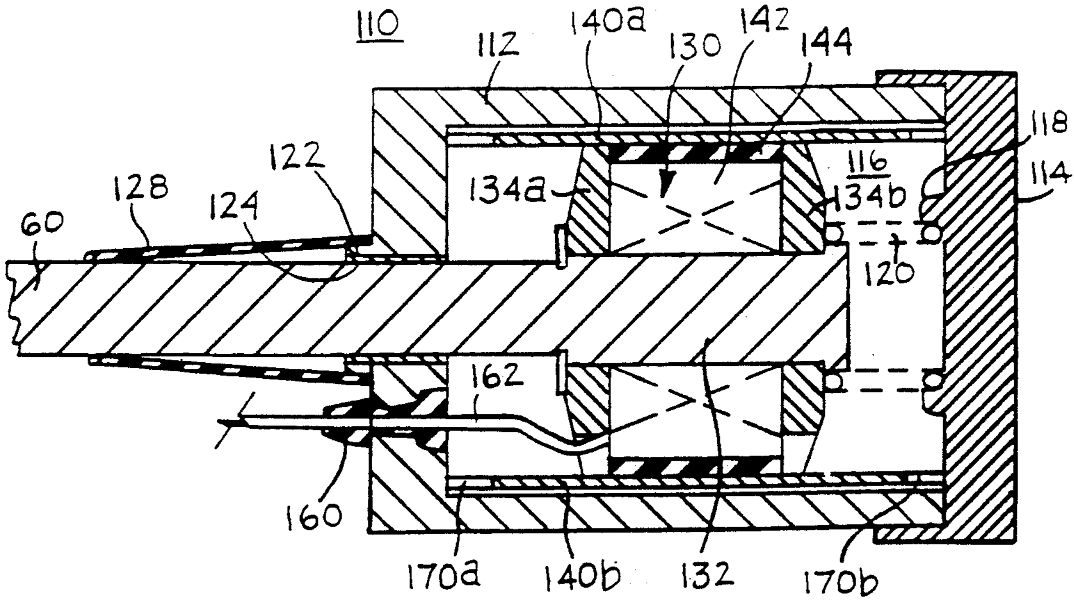
FIG. 6 illustrates a cross-sectional side view of another embodiment of the present invention.

FIG. 6 illustrates another embodiment of a waste gate brake 110. The waste gate brake 110 comprises a housing 112 preferably fabricated of a plastic material having an end cap 114. The housing defines a chamber 116. Formed on the end cap 114 is an annular offset 118 adapted to receive an end of a preload spring 120. An environmental cover or boot 128 is secured to the housing and about the shaft 60 to prevent contaminants from restricting shaft motion. An opening 122 is provided, through which the shaft 60 extends, may include a Teflon coating, or alternatively a separate bushing 124, may be inserted therein to guide the motion of shaft 60. Moveably positioned within the chamber 116 is an electromagnetic assembly generally shown as 130. The electromagnetic assembly 130 is attached to an enlarged end 132 of the shaft 60. The electromagnetic assembly 130 comprises a plurality of electromagnetic poles 134*a* and *b* having a radially tapered cross-section which is advantageous since it permits a greater portion of the flux generated upon activation of the electromagnetic assembly to flow substantially perpendicular to the axis of the shaft 60 to attract a holding member. The holding member may be a cylindrical ring (not shown) having a split wall. Alternatively, the holding member may comprise separate cylindrical sections (cylindrical split rings). In the embodiment shown, two such split rings 140*a* and *b* are used, however, a greater number of sections may be employed.

The electromagnetic assembly comprises a coil 142 wound about the end 132 of the shaft 60 between the pole pieces 134*a* and *b*. Positioned about the circumference of the coil 142 is a circumferential layer of friction material 144. This friction material can be manufactured of elastomeric material and extends radially slightly beyond the narrowed ends of the pole pieces 134*a* and *b*.

Figure 7:
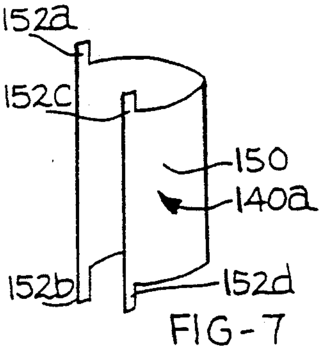
FIG. 7 illustrates a projected view of a split ring.

The holding member(s) 140*a* and *b* are positioned about the periphery of the chamber 116. FIG. 7 illustrates a projected view of one such split ring 140*a*. The split ring 140*a* comprises a cylindrical wall 150 which conforms to the shape of the chamber 116 walls and a plurality of legs 152*a–d*. The length between pairs of opposingly positioned legs such as 152*a* and 152*b* is sized to be slightly less than the axial dimension of the chamber 116. The coil 142 is communicated to a terminal assembly 160 through an electrically conductive connecting member 162. This member 162 may be a strand of fine gaged wire, wire weave, a coil of wire, or a current-carrying spring.

In operation the preload spring 120 biases the shaft 60 and electromagnetic assembly 130 outwardly in a manner to urge the waste gate to its fully closed condition. As the waste gate is moved in response to the stream of engine exhaust gases, its motion is directly transmitted to the shaft via the linkage 36 causing the shaft and electromagnetic assembly to move axially within the housing 112. In response to a control signal generated by the ECU 42 an electromagnetic force is generated thereby urging the split rings 140*a* and *b* inwardly into contact with the friction material 144. Since the length of each split ring is substantially equal to the inner dimension of the chamber 116, its axial motion is severely restricted. Upon engagement of the split rings 140 with the electomagnetic assembly 130, i.e., friction material, the electromagnetic assembly is fixed in place. Upon removal of the control signals the electromagnetic assembly 130 and shaft 60 are free to move with the waste gate 34. As mentioned above, during continued operation of the brake, one can anticipate wearing of the friction material. As can be seen from FIGS. 6 and 7, the wall 150 of each split ring 140*a* or *b* is spaced from the ends of the chamber 116 by virtue of the extending legs 152. This design provides for a receptacle 170*a* and *b* on each side of the split rings 140*a* and *b* into which particles of the friction material 144, metal filings, etc. may accumulate so as not to affect the operation of the waste gate brake 110.

Figure 8:
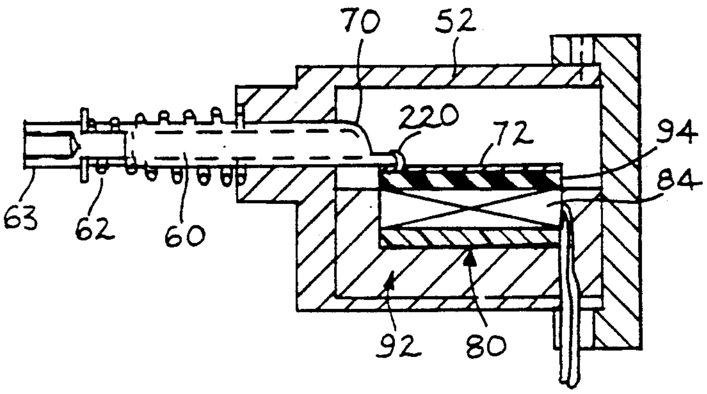
FIG. 8 illustrates a further embodiment of the present invention.

FIG. 8 illustrates an alternate embodiment of the invention having an apertured housing 52 into which is received the shaft 60. Fixedly situated within the housing is an electromagnetic assembly 92 comprising the electromagnet 82 and and coil 84. A potting compound 90 may be used if appropriate. Positioned atop the electromagnet is a strip of friction material 94. Attached to the inner end 70 of the shaft is a flat plate 72. In the embodiment of FIG. 8 the plate 72 is attached to the shaft by a hinge 220 which provides an additional degree of freedom, permitting the plate 72 to be brought into contact with the friction material 94 upon excitation of the coil 84. It should be appreciated that a separate hinge 220 is not a requirement of the present invention, that is, the additional degree of freedom may be obtained by fabricating the plate 72 of a flexible ferromagnetic material such that upon energization of the magnet 80 the plate 72 may flex downwardly toward the magnet into contact with the friction material 94.

Many changes and modifications in the above described embodiment of the invention can, of course, be carried out without departing from the scope thereof. Accordingly, that scope is intended to be limited only by the scope of the appended claims.

We claim:

1. A device (50, 110, 200) comprising:

a housing (52, 112) defining a chamber (54; 116) and having a first opening (58*a,b*; 122) into the chamber;

a shaft (60) having two ends, one end extending exteriorly of the housing and the other end interiorly in the chamber, the other end being linearly movable progressively into and out of the chamber, the shaft movable in response to forces exerted on the one end;

first means (78, 80; 130, 140) for defining a magnetic path, for generating an electromagnetic force in such path and for preventing the shaft (60) from moving, comprising ferromagnetic means (70; 140), forming part of the magnetic path and being positioned within the chamber, said ferromagnetic means being coupled to the other end of the shaft; and an electromagnetic assembly means (92; 130) positioned within the chamber and spaced apart from the ferromagnetic means in an unlocked position, for generating the magnetic force in response to an operating parameter, the electromagnetic means being slidably movable in the chamber in response to the magnetic force, into locking engagement with the ferromagnetic means to lock the ferromagnetic means in place and hence lock the shaft at its then current position corresponding to a condition of the operating parameter.

2. The device as defined in claim 1 wherein the first means includes friction material means (94; 144; 90) situated between the ferromagnetic means (70; 140) and electromagnetic assembly means (92; 130) and wherein the ferromagnetic means is slidably movable relative to the friction material means and when the electromagnetic means is moved into the locking engagement the friction material means is moved into engagement with the ferromagnetic means to generate a frictional force therebetween to further impede the motion of the shaft (60).

3. The device (50) as defined in claim 2 wherein the ferromagnetic means comprises a magnetically responsive plate (72) extending from an inner end (70) of the shaft (60).

4. The device (50) as defined in claim 2 wherein the friction material means (94; 144; 90) comprises a layer of friction material secured to the electromagnetic assembly means (92; 130) having a friction generating surface facing the ferromagnetic means.

5. The device as defined in claim 2 wherein the electromagnetic assembly means (92) comprises:

a stator (82), a coil (840 cooperatively wound thereabout, wherein the friction material means is secured to and extends above portions of the stator.

6. The device as defined in claim 5 wherein the electromagnetic assembly means (92) includes potting material (90) about the stator (82) and coil (84).

7. The device as defined in claim 6 wherein the potting material (90) below the stator (82), is formed with a mating projecting (98) for interaction with a groove (96) on the housing.

8. The device as defined in claim 6 wherein the potting material covers the stator (82) on a top surface thereof and comprises the friction material means for engagement with the plate (72).

9. The device as defined in claim 5 wherein the stator (82) is an E-shape.

10. The device as claimed in claim 5 wherein the stator (82) is a C-shape.

11. The device as defined in claim 5 including standoff means (202) for spacing the electromagnetic assembly from the housing (52) such that portions of worn material can accumulate therein.

12. A device (50, 110, 200) comprising:

a housing (52, 112) defining a chamber (54; 116) and having a first opening (58*a,b*; 112) into the chamber;

a shaft (60) having two ends, one end extending exteriorly of the housing and the other end interiorly in the chamber, the other end movable progressively onto and out of the chamber, the shaft movable in response to forces exerted on the one end;

first means (78, 80; 130, 140) for defining a magnetic path, for generating an electromagnetic force in such path and for preventing the shaft (80) from moving, comprising ferromagnetic means (70; 140), forming part of the magnetic path and being positioned within the chamber; and an electromagnetic assembly means (92; 130) positioned within the chamber and spaced apart from the ferromagnetic means in an unlocked position, comprising an electromagnet for generating the magnetic force in response to an operating parameter, the electromagnetic means being slidably movable in the chamber, coupled to the other end of the shaft and movable therewith; and friction material means situated about the electromagnet for providing a friction surface; wherein the ferromagnetic means is positioned about the periphery of the chamber (116) and disposed therein for providing a clamp against the electromagnetic means (130); the ferromagnetic means movable into locking engagement with the electromagnetic assembly means in response to the magnetic force to lock the electromagnetic assembly means in place and hence lock the shaft at its then current position corresponding to a condition of the operating parameter.

13. The device as defined in claim 12 further including bias means (120) for outwardly biasing the electromagnetic assembly means (130) and shaft (60) relative to the housing (112).

14. The device as defined in claim 12 wherein the ferromagnetic means (140) comprises:

a ferromagnetic cylindrical ring (150).

15. The device as defined in claim 12 wherein the ferromagnetic means comprises a plurality of split cylindrical sections (150).

16. The device as defined in claim 15 wherein each split cylindrical section (140) comprises:

an arcuate wall (150) and a plurality of legs (152) extending from the wall (150).

17. The device as defined in claim 16 wherein the legs (152) are arranged with at least one pair of opposingly situated legs.

18. The device as defined in claim 17 wherein the distance between the ends of the pair of legs is slightly less than the axial length of the chamber (116).

19. The device as defined in claim 18 wherein the extending legs (152), wall (150) and chamber (116) cooperate to provide a collection area for any material dislodged from the electromagnetic assembly means and ferromagnetic means.

20. The device as defined in claim 12 wherein the ferromagnetic means (140) has a limited travel about a direction parallel to the axis of the housing.

21. The device as defined in claim 12 wherein the electromagnetic assembly means (130) includes:

second means (134) for concentrating magnetic flux and directing same to flow generally radially into and out from the electromagnetic means (130).

22. The device as defined in claim 12 wherein the electromagnetic assembly means comprises:

spaced pole pieces (134) disposed radially on each side of a coil (132);

the shaft (60) connecting the pole pieces and having one end extending from the housing for connection to a waste gate (34)

a coil (132) positioned about the shaft between the pole pieces and;

a band of friction material (144) circumferentially disposed about the coil (132) extending radially beyond the pole pieces.

23. The device as defined in claim 22 wherein the bias means comprises a spring (120) situated between one of the pole pieces (134*b*) and the housing.

24. A device (50, 110, 200) comprising:

a housing (52, 112) defining a chamber (54; 116); 122) into the chamber;

a shaft (60) linearly movable into and out from the housing, the shaft movable in response to a force exerted on one end;

ferromagnetic means (70; 140), forming part of the magnetic path and coupled to another end of the shaft;

an electromagnetic assembly means (92; 130) positioned apart from the ferromagnetic means, for generating the magnetic force in response to an operating parameter, and friction material means (94; 144; 90) situated between the ferromagnetic means (70; 140) and electromagnetic assembly means (92; 130), wherein the ferromagnetic means is slidably movable relative to the friction material means, wherein the electromagnetic assembly means (92, 130) is fixedly positioned in the housing (52, 112) and wherein the ferromagnetic means comprises a plate (72) movable relative to the shaft (60) such that when the magnetic force is generated the plate moves into contact with the friction material means to lock the shaft in its then current position in response to a frictional force therebetween and the magnetic force.

25. The device as defined in claim 24 wherein the plate (72) is hinged relative to the shaft (60) and movable into locked engagement with the friction material means (94) upon excitation of the electromagnetic assembly means.

26. The device as defined in claim 24 wherein the plate (72) is flexible and movable into locked engagement with the friction material means upon excitation of the electromagnetic assembly means.

27. The device (50) as defined in claim 1 wherein the shaft (60) is of a non-ferrous material.

28. The device (50) as defined in claim 27 wherein the shaft is hollow.

29. The device (50) as defined in claim 1 including second means (96, 98; 93) for preventing relative rotation between the electromagnetic assembly means (92) and the ferromagnetic means (70).

30. The device (50) as defined in claim 21 wherein the second means comprises:

a longitudinal groove (96) on a lower portion of the housing (52) and a mating projection (98) formed in the electromagnetic assembly means.

31. The device (50) as defined in claim 30 wherein the depth of the groove (96) and extension of the projection are greater than the air gap through which the electromagnetic assembly moves, such that at least a portion of the projection remains within the groove.

32. The device (50) as defined in claim 29 wherein the second means comprises;

guide means (93) longitudinally extending within the housing (52) for extraining the ferromagnetic means.

33. The device as defined in claim 32 wherein the guide means (93) comprises longitudinally extending, opposingly positioned slots for slidably receiving the ferromagnetic means.

34. The device as defined in claim 1 wherein the housing (52) includes a second opening (58*b*) generally opposite the first opening (58*a*) and wherein;

the shaft (60) extends through and is supported at both the first and second openings (58*a,b*).

35. The device (50) as defined in claim 1 including bias means (64, 120) for urging the shaft (60) outwardly in a direction to urge the waste gate toward a fully close position.

36. A system comprising the device as defined in claim 1 or claim 24 including a turbocharger (20) linked to a clean air intake of an engine (12) to provide boost air thereto and operatively rotated by exhaust gas produced by the engine (12);

a waste gate (34) disposed in a bypass passage (32) of the turbocharger and rotatable in response to the level of exhaust gas flow, the waste gage linked to the one end of the shaft (60) so as to move same as its rotates, wherein when the shaft is locked by the action of the electromagnetic assembly means the waste gate is also locked in its then current position corresponding to a condition of the operating parameter.

* * * * *